United States Patent [19]

Shirai et al.

[11] Patent Number: 5,550,452
[45] Date of Patent: Aug. 27, 1996

[54] INDUCTION CHARGING APPARATUS

[75] Inventors: Ichiro Shirai; Hitoshi Yamagami, both of Kyoto; Eiichi Hiroshige; Koichi Kubo, both of Fukuoka-ken, all of Japan

[73] Assignees: Nintendo Co., Ltd., Kyoto; Kyushu Hitachi Maxell, Ltd., Fukuoka-ken, both of Japan

[21] Appl. No.: 279,004

[22] Filed: Jul. 22, 1994

[30] Foreign Application Priority Data

Jul. 26, 1993 [JP] Japan ................................. 5-204581

[51] Int. Cl.$^6$ ............................................. H01M 10/46
[52] U.S. Cl. ............................................. 320/2; 336/DIG. 2
[58] Field of Search ........................... 320/2, 5; 336/224, 336/DIG. 2

[56] References Cited

U.S. PATENT DOCUMENTS

| | | | |
|---|---|---|---|
| 3,938,018 | 2/1976 | Dahl . | |
| 5,070,293 | 12/1991 | Ishii et al. | 320/2 |
| 5,159,256 | 10/1992 | Mattinger et al. | 320/2 |
| 5,216,402 | 6/1993 | Carosa . | |
| 5,327,065 | 7/1994 | Bruni et al. | 320/2 |
| 5,461,299 | 10/1995 | Bruni | 320/2 |

FOREIGN PATENT DOCUMENTS

| | | |
|---|---|---|
| 298707 | 1/1989 | European Pat. Off. . |
| 3417455 | 11/1985 | Germany . |
| 3903587 | 8/1989 | Germany . |
| 51-89124 | 3/1976 | Japan . |
| 62-260526 | 11/1987 | Japan . |
| 2094574 | 9/1982 | United Kingdom . |

Primary Examiner—Peter S. Wong
Assistant Examiner—Edward Tso
Attorney, Agent, or Firm—Wenderoth, Lind & Ponack

[57] ABSTRACT

The induction charging apparatus has a power source unit and a device unit which can be detachably coupled to the power source unit. The power source unit has a first casing having one end opened, a primary coil provided in the first casing, an oscillator for supplying an alternating current to the primary coil to generate magnetic fluxes, and a depressible member movably provided and closing the open end of the first casing. The depressible member is movable between a lift position at which the magnetic fluxes are substantially located under the depressible member, and a depressed position at which portions of the magnetic fluxes are substantially located over the depressible member. The device unit has a second casing having one end detachable to the open end of the first casing, a secondary coil provided in the second casing and adjacent to the one end, and rechargeable battery provided in said second casing for receiving power from the secondary coil. When the second casing is attached to the first casing, the depressible member is moved to the depressed position to electromagnetically couple the primary and secondary coils.

11 Claims, 7 Drawing Sheets

INDUCTION CHARGING APPARATUS

BACKGROUND OF THE INVENTION

1. Field of the Invention

The present invention relates to an induction charging apparatus for use in various kinds of electric apparatuses such as, portable game machines, power-driven tooth brushes, electric tools, or the like and, more particularly, to an induction charging device having a power source unit and a battery unit detachably connected to the power source unit for the supply of electric power from a commercial power source through the power source unit to the battery unit, utilizing the electromagnetic induction coupling between the power source unit and the battery unit.

2. Description of the Prior Art

In the conventional arrangement of induction charging apparatuses of the aforementioned type, a secondary battery (rechargeable battery) is installed in a unit of the device. Normally, the unit of the device is set to a power source and prepared to stand a short-term driving load while the secondary battery is kept charged with a minute current from the power source. Therefore, a primary oscillator section, e.g., an inverter circuit or the like at the side of the power source is always held in the driving state, and at the same time, the output of the primary oscillator section is controlled depending on the presence/absence of the load in the device unit so as to save power in case the device unit is separated from the power source for a long time.

In the arrangement as above, in the case where the available output power from the primary oscillator section is increased and if a metallic element such as a clip or the like, instead of the device unit, is brought close to a primary coil, the metallic element is erroneously recognized as a proper load. In consequence, an excessive amount of eddy current is fed and heat is generated.

The inventors have discovered from the studies of the aforementioned inconvenience that, when the primary oscillator section is maintained always in the driving state and the primary coil is accommodated in the power source unit while being separated from a touching face thereof to the power source, the magnetic flux density at the peripheral surface of a main casing can be made as small as possible, and moreover, if a touching face of the power source is made movable to the primary coil in the interlocking movement with setting of the device unit to the power source, the above inconvenience is perfectly solved.

SUMMARY OF THE INVENTION

The object of the present invention is therefore to provide an induction charging apparatus which can avoid generation of heat caused by a foreign matter, for example, a metallic element or the like disposed in proximity to a power source unit.

According to the present invention, an induction charging apparatus has a power source unit and a device unit detachable from the power source unit.

The power source unit comprises: a first casing having one end opened; a primary coil provided in said first casing; oscillator means provided in said first casing for supplying an alternating current powered by a commercial alternating current power source to said primary coil to generate magnetic fluxes; and a depressible member movably provided and closing said open end of said first casing, said depressible member movable between a lift position at which said magnetic fluxes are substantially located under said depressible member and inside said first casing, and a depressed position at which portions of said magnetic fluxes are substantially located over said depressible member and outside said first casing.

The device unit comprises: a second casing having one end detachable to said open end of said first casing; a secondary coil provided in said second casing and adjacent to said one end; and load means provided in said second casing for receiving power from said secondary coil, whereby when said second casing is attached to said first casing with said depressible member being moved to said depressed position, said primary and secondary coils are coupled to link said magnetic fluxes from said primary coil to said secondary coil, and when said second casing is detached, said depressible member is moved to said lift position to prevent the leakage of said magnetic fluxes.

The present application is based upon Japanese Patent Application Serial No. 5-204581 which was filed on Jul. 26, 1993, the entire content of which is expressly incorporated by reference herein.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1A:
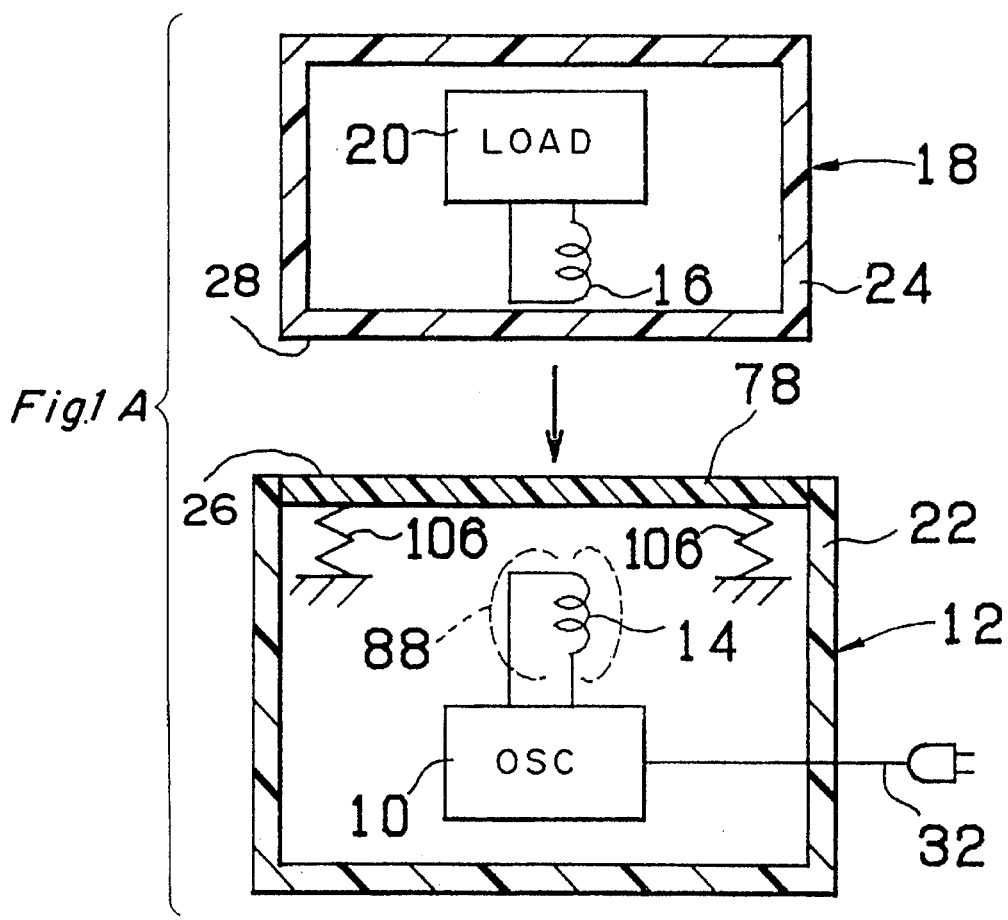
FIGS. 1A and 1B are diagrams showing basic structure of an induction charging apparatus of the present invention, FIG. 1A particularly showing a state when a device unit is separated from a power source unit, and FIG. 1B particularly showing a state when the units are coupled to each other.
Figure 1B:
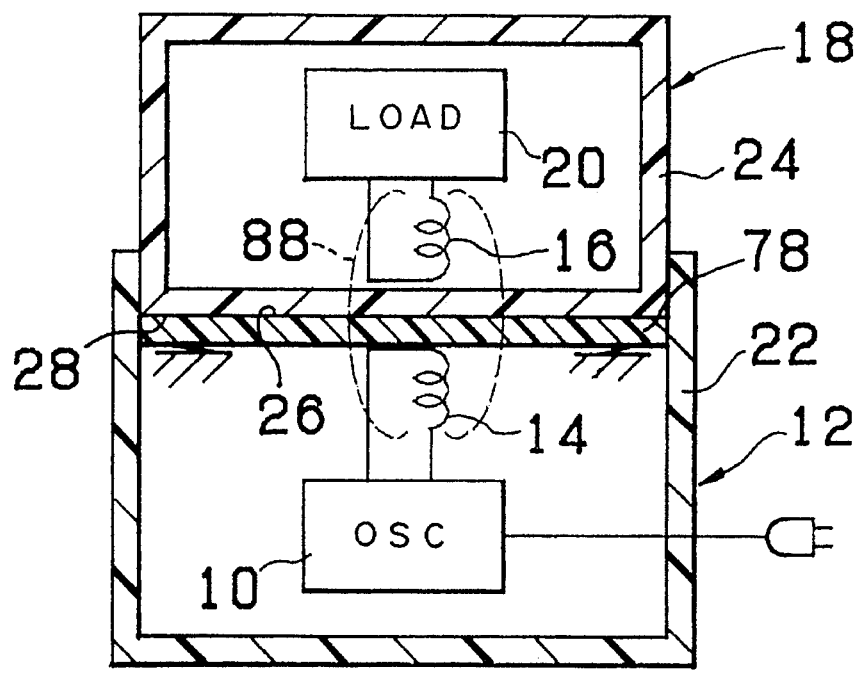

First the principle of the present invention will be described. The induction charging apparatus of the present invention is, as schematically shown in FIGS. 1A and 1B, and includes a power source unit 12 and a device unit 18. For supplying power to a load 20 in the device unit 18, the units 12 and 18 are held in contact with each other at least partly at confronting surfaces thereof, and after the power supply, the units 12 and 18 are detached from each other. The power source unit 12 includes a first casing 22, a primary coil 14 accommodated in the first casing 22, and a primary oscillator section 10 also provided in the first casing 22 for feeding an alternating current power supplied from a commercial alternating current power source to the primary coil 14.

The device unit 18 has a second casing 24, a secondary coil 16 inside the secondary casing 24 which is to be coupled to the primary coil 14 through electromagnetic induction, and a load 20, such as a rechargeable battery, housed in the second casing 24 and receiving electric power from the secondary coil 16.

When the device unit 18 is separated from the power source unit 12, an outer face 26 of a depressible member 78 of the first casing 22 which comes in contact with the second casing 24 is held away by a predetermined distance from the primary coil 14. When the device unit 18 is mounted, the outer face 26 is depressed down by a part of a face 28 of the second casing 24 so that the depressible member 78 moves towards the primary coil 14.

As shown in FIG. 1A, while the power source unit 12 is separated from the device unit 18, the depressible member 78 is held a predetermined distance away from the primary coil 14. Thus, the magnetic flux density of a magnetic field 88 generated from the primary coil 14 is very small at places over the outer face 26 of the depressible member 78, giving no or very little electromagnetic influences to a foreign matter such as a metallic element or the like which is put on the outer face 26 of the power source unit 12.

When the device unit 18 is coupled to the power source unit 12 with the depressible member 78 depressed down, as indicated in FIG. 1B, the primary and secondary coils 14 and 16 come close to each other. Thus, the coils 14 and 16 are electromagnetically induced and coupled with each other, so that a predetermined power is supplied to the load 20 of the device unit 18 from the source unit 12.

As depicted hereinabove, since the magnetic field 88 leaking outside the first casing 22 when the device unit 18 is detached from the power source unit 12 is restricted to be as small as possible, it is possible to prevent a metallic element in the vicinity of the source unit 12 from being heated by the electromagnetic influence, such as by the eddy current.

On the other hand, in the case where the device unit 18 is coupled to the power source unit 12, the depressible member 78 of the power source unit 12 is depressed and moved closely adjacent to the primary coil 14, whereby the power is efficiently supplied to the load 20 in the device unit 18 from the power source unit 12.

Next, a preferred embodiment of the present invention will be described hereinbelow. It is needless to say, however, that the present invention is not limited to the example, but may be generally similarly applied in power-driven tooth brushes, power-driven tools and the like kinds of electric apparatuses.

Figure 2:
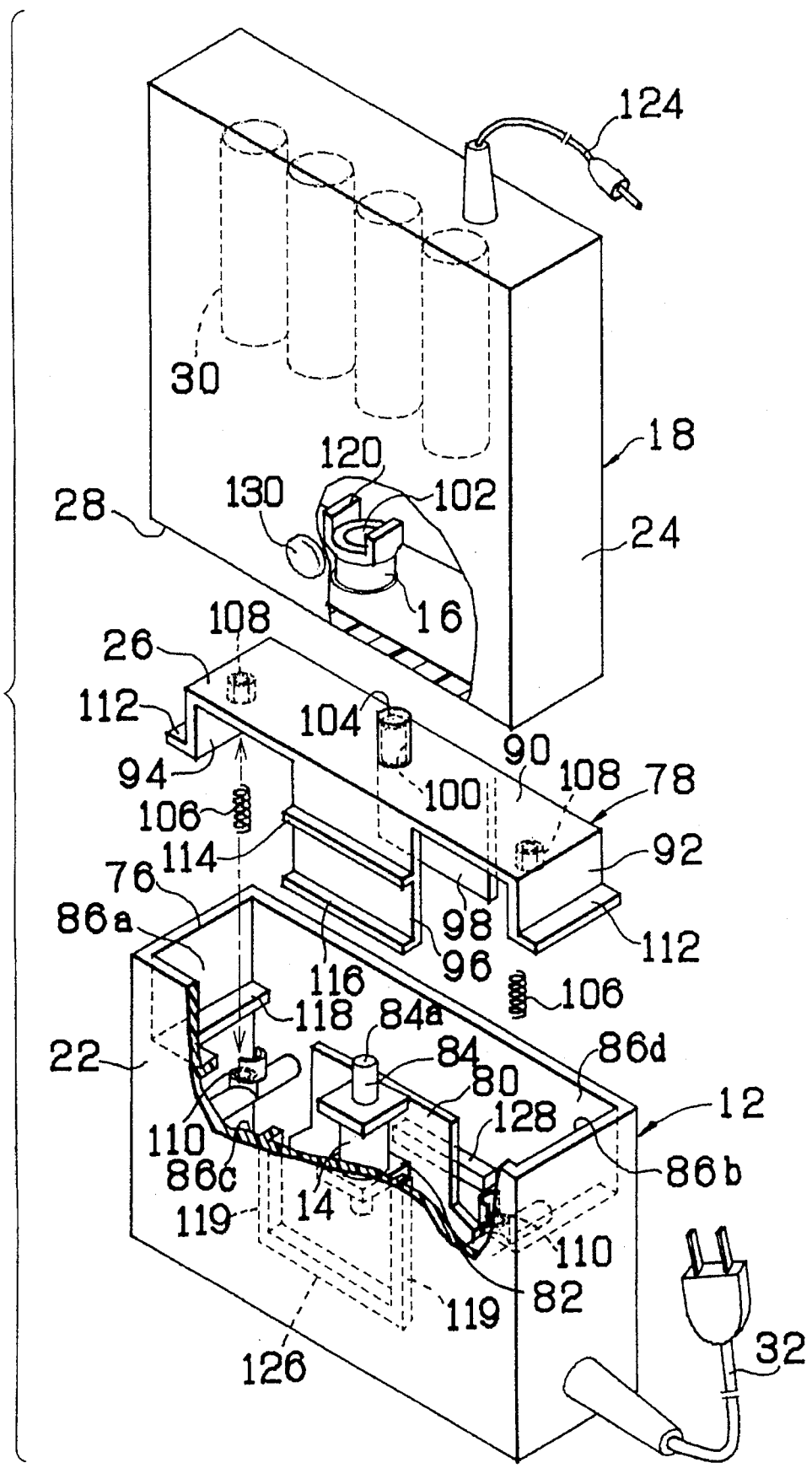
FIG. 2 is a partially-cut exploded perspective view of an induction charging apparatus according to a preferred embodiment of the present invention.
Figure 3:
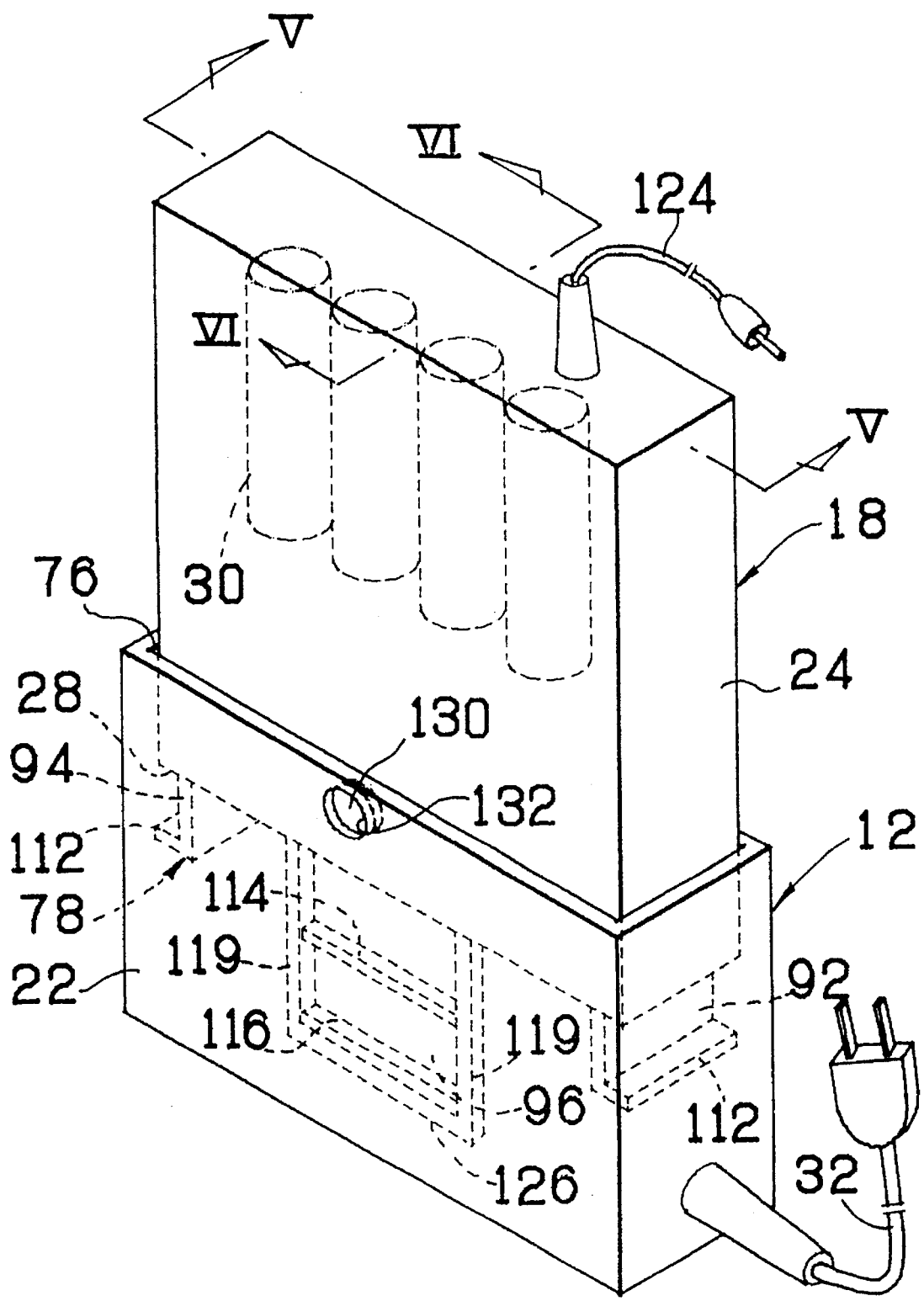
FIG. 3 is a perspective view of the induction charging apparatus of the present invention particularly showing a state when the device unit and the power source unit are coupled.

As is understood from the total structure shown in FIGS. 2, 3, the charger of the invention is constituted of an inverter equipped power source unit 12 and a device unit 18. The power source unit 12 and the device unit 18 can be detachably engaged so that a secondary battery 30 provided inside the device unit 18 can be charged by a charging current sent from the power source unit 12 through electromagnetic induction coupling.

Figure 7:
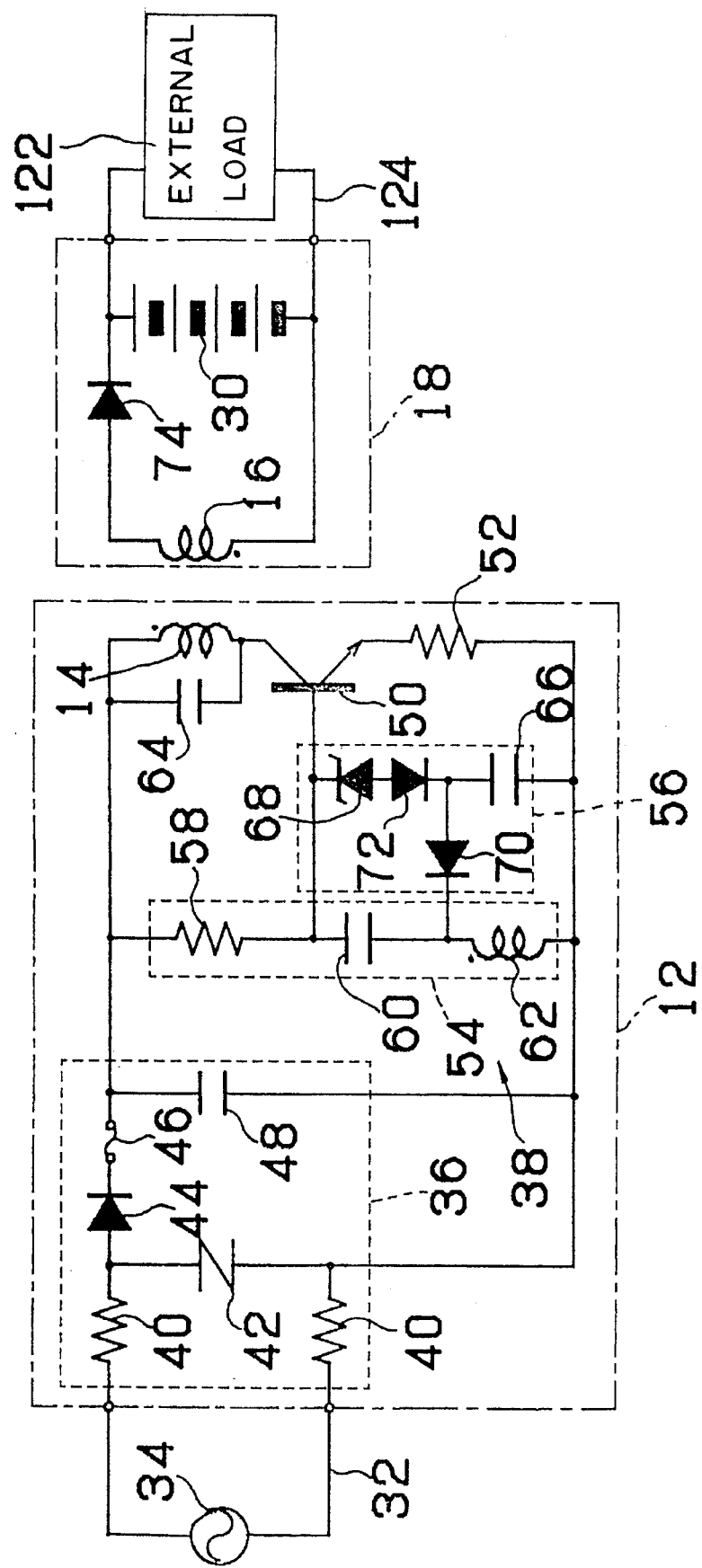
FIG. 7 is a circuit diagram of an induction charger employed in the preferred embodiment.

Referring to FIG. 7, an electric circuit of an induction charger provided in the power source unit 12 and device unit 18 is shown. The charger has a socket that can be connected to a commercial alternating current power source 34 via a power source cable 32 extending outside a first casing 22 of the power source unit 12. The alternating current power is applied to a protecting circuit 36 and in turn to an inverter circuit 38.

In the protecting circuit 36, a large current is blocked by metallic film resistor 40 connected in series to a power line of the inverter circuit 38, while a surge voltage is shut by an voltage absorbing element 42 connected parallel to the power line. The input voltage is rectified by a rectifier 44. If a current more than a permitted level should flow, a fuse 46 connected between the rectifier 44 and the inverter circuit 38 will brake to prevent the overflow of the current. Also, noise signals from the inverter circuit 38 are cut off by a capacitor 48.

The inverter circuit 38 has a primary coil 14 and a protecting resistor 52 which are connected respectively to a collector and an emitter of a switching transistor 50. The base of the switching transistor 50 is connected to controllers 54 and 56.

The controller 54 has a series circuit of a resistor 58, a capacitor 60 and a feedback coil 62. The ON/OFF cycle of the switching transistor 50 is regulated to about 40 KHz by a time constant of the resistor 58 and capacitor 60 of the controller 54. The switching transistor 50 is also controlled to be turned ON by the feedback coil 62 and capacitor 60.

More specifically, when capacitor 60 is charged via resistor 58 to provide a predetermined voltage to the base of switching transistor 50, a collector current starts to flow in the primary coil 14. The increase of the collector current causes the feedback coil 62 to generate voltage which will eventually turn the switching transistor 50 ON. As a result, the transistor 50 is abruptly turned ON. After the turn On of the switching transistor 50, the charging and discharging of the capacitor 60 proceeds, resulting in the reduction of the base current to reverse the voltage generated across the feedback coil 62. Accordingly, a reverse bias is added between the base and emitter of the transistor 50, causing transistor 50 to rapidly turn OFF. By the turn ON and OFF of transistor 50 repeatedly in the above-described manner, the inverter circuit 38 makes self-excited oscillation at a predetermined frequency.

A capacitor 64 connected in parallel to the primary coil 14 absorbs an impulse voltage generated when the transistor 50 is brought to OFF state. The protecting resistor 52 connected to the emitter of the transistor 50 causes to increase the emitter voltage of the transistor 50 in response to the increase of the collector current, thereby regulating the timing when the transistor is turned OFF and preventing the entry of an excessive current to the transistor 50.

The controller 56 has a capacitor 66 connected in parallel to the feedback coil 62 and a Zener diode 68 connected in series to the capacitor 66 through a diode 72. A diode 70 inserted between the feedback coil 62 and capacitor 66 allows the transistor 50 to be charged only when the transistor 50 is in the OFF state. Diode 72 between the Zener diodes 68 and capacitor 66 is turned ON by the base voltage of the switching transistor 50 in the ON state thereby to discharge the capacitor 66.

The charging voltage of the capacitor 66 charged by the feedback coil 62 during OFF of the switching transistor 50 is increased as the load current of the inverter circuit 38 becomes smaller. This is caused by the poor regulating characteristic of an inverter transformer formed by primary and secondary coils 14 and 16. The charging voltage which is added to the base voltage serves to turn the Zener diode 68 ON. Accordingly, the Zener diode 68 is turned ON by a base voltage lower than that at the normal time, dividing the base current and shortening the ON time of the transistor 50.

By this arrangement, the power consumed in the inverter circuit 38 is made as small as possible when the device unit 18 is detached from the power source unit 12, i.e., when no load or little load is impressed.

The power signal from inverter 38 with a frequency higher than the commercial frequency is, after being lowered to the charging voltage in the secondary coil 16 of the device unit 18 which is electromagnetically induced and coupled to the primary coil 14, rectified by diode 74 to half-wave voltage and is used for charging the secondary battery 30.

According to the present invention, the coupling mechanism of the primary and secondary coils 14 and 16, particularly, the structure of the power source unit 12 is novel. As shown in FIG. 2, the electric circuit of the power source unit 12 is accommodated in the first casing 22 which is opened at 76. Further, the power source unit 12 is provided with a depressible member 78 made of non-magnetic material, such as plastics, and having a cover plate 90 for covering the opening 76. The depressible member 78 can be depressed down in the opening 76.

The primary coil 14 is provided inside the first casing 22 such that the primary coil 14 is wound around a coil bobbin 82 secured to a flat printed circuit board 80. A magnetic core 84 of a ferromagnetic body of high magnetic permeability, e.g., ferrite, is inserted through the primary coil 14. A portion of the magnetic core 84 protrudes from the upper face of the bobbin coil 82 by a predetermined distance. The rear face of the printed circuit board 80 is fixed to the inner face 86d of the first casing 22 with a suitable stop bar 128, serving as a spacer. The magnetic core 84 of the primary coil 14 is hence disposed approximately at the center inside the first casing 22 and directed upward in the vertical direction.

Figure 4:
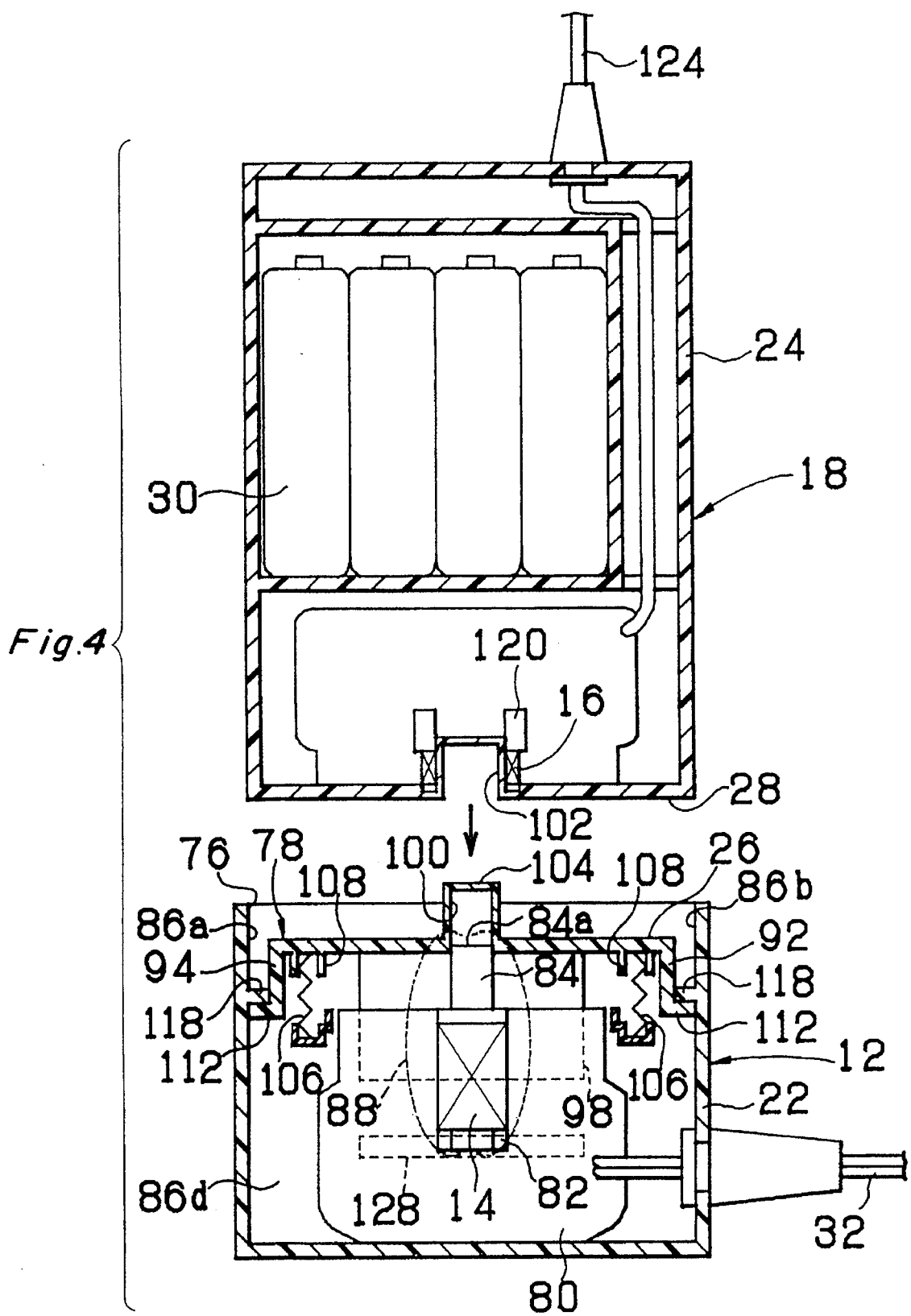
FIG. 4 is a cross-sectional view of the induction charging apparatus of FIG. 1, particularly showing a state when the device unit and the power source unit are separated.

The depressible member 78 is normally held up and separated from the primary coil 14, as shown in FIG. 4, so that the region above the depressible member 78 in the normal position is spaced a predetermined distance from the magnetic core 84. Thus, density of the magnetic flux 88 generated by the primary coil 14 will not so be intense above the depressible member 78. Thus, even if some metallic object, such as a paper clip, should be placed on a face 26 of the depressible member 78, very few magnetic flux 88 will intersect the paper clip, resulting in very low power consumption in the paper clip.

On the other hand, when the face 26 is depressed by the device unit 18, the depressible member 78 slides down towards the primary coil 14 to closely couple the primary coil 14 with the secondary coil 16 via the magnetic core 84.

Specifically, cylindrical engaging parts 108 are formed at opposite ends, in the longitudinal direction, of the lower face of the depressible member 78. At each end, an urging member 106 such as a coil spring or the like is fitted. The other end of the urging member 106 is inserted in receiving recess 110 formed in the first casing 22. The depressible member 78 is urged upward by the elasticity of the urging members 106 when the device unit 18 is not coupled to the power source unit 12.

Further, the depressible member 78 has four guide plates 92, 94, 96, 98 extending downwardly from the four sides of the rectangular cover plate 90 which is slightly smaller than the opening 76. Each of the first and second guide plates 92, 94 as a first and a second guide means extending from opposing short sides of the cover plate 90 have approximately the same length as the depress distance of the cover plate 90. A rib 112 is formed extending outward from the lower end of each of the guide plates 92 and 94. The third and fourth guide plates 96, 98 extending respectively from opposing long sides of the cover plate 90 are slightly longer than the first and second guide plates 92 and 94. The rib 114 is provided at the same level as the rib 112 and also a guide rib 116 is arranged at further lower end of the third guide plate 96. The ribs are provided for engagement with corresponding ribs provided in the casing 22 to prevent the depressible member 78 from falling out from the casing 22, as described below.

Formed inside the first casing 22 is a U-shaped rib 118 extending along the three inner faces 86a, 86b and 86c at places confronting to the first-third guide plates 92, 94, 96. Therefore, as shown in FIG. 4, the rib 118 of the first casing 22 is normally engaged and held in contact with the ribs 112, 114 of the depressible member 78 by the springs 106. When the device unit 18 is separated, the distance of an upper face 26 of the depressible member 78 to the primary coil 14 is maintained to be a predetermined distance, and the depressible member 78 is prevented from falling off from the first casing 22.

As best shown in FIG. 2, the length of guide ribs 116 and 114 of the third guide plate 96 is made slightly shorter than the distance between columns 119 provided on the inner face 86c, so that opposite ends of ribs 116 and 114 slides along the side faces of the columns 119. By this arrangement, the sideway wobbling movement (in a direction parallel to ribs 116 and 114) of the depressible member 78 can be prevented. Also, the fourth guide plate 98 is slidingly inserted in a space between the rear face of the printed circuit board 80 and the inner face 86d of the first casing 22. By this arrangement, back and force wobbling movement (in a direction parallel to ribs 112) of the depressible member 78 can be prevented. Furthermore, when the depressible member 78 is depressed a predetermined distance, a further depression of the depressible member 78 is prevented by the contact between the bottom face of rib 116 and stop bar 126 extending between columns 119, and also by the contact between the bottom face of fourth guide plate 98 and stop bar 128. The depressible member 78 is accordingly prevented from being pressed excessively into the first casing 22. Also, by the above arrangement, the depressible member 78 is prevented from being caught in the opening 76 and becoming unable to slide when the depressible member 78 is depressed in a slanted direction.

Further, an engaging projection 104 is formed almost at the center of the cover plate 90, projecting upward from the face 26 of the cover plate 90. The engaging projection 104 has a hole 100 into which the front end of the magnetic core 84 of the primary coil 14 is fitted from below. While the power source unit 12 and the device unit 18 are coupled together, the engaging projection 104 is inserted into an engaging hole 102 at the center of the secondary coil 16 in the device unit 18.

Since the magnetic core 84 can be easily broken or chipped, the size of the hole 100 is so arranged that some clearance is provided around the magnetic core 84 even after the depressible member 78 is fully depressed. The break or detachment of the magnetic core 84 not only decreases the charging efficiency, but is dangerous to cause a fire or the like by the generated heat.

The cross-sectional size of the second casing 24 is slightly smaller than the cross-sectional size of the first casing 22. A bobbin 120 of the secondary coil 16 is fixed inside the second casing 24, with its center aligned with the center of the engaging hole 102. Secondary battery 30 is provided in the second casing 24 for changing electric power transmitted from coil 14 to coil 16. A direct current power source cable 124 extends from the upper face of the second casing 24 to supply DC power from the secondary battery 30 to an external load 122 of the electric apparatus, such as a motor or the like.

Figure 5:
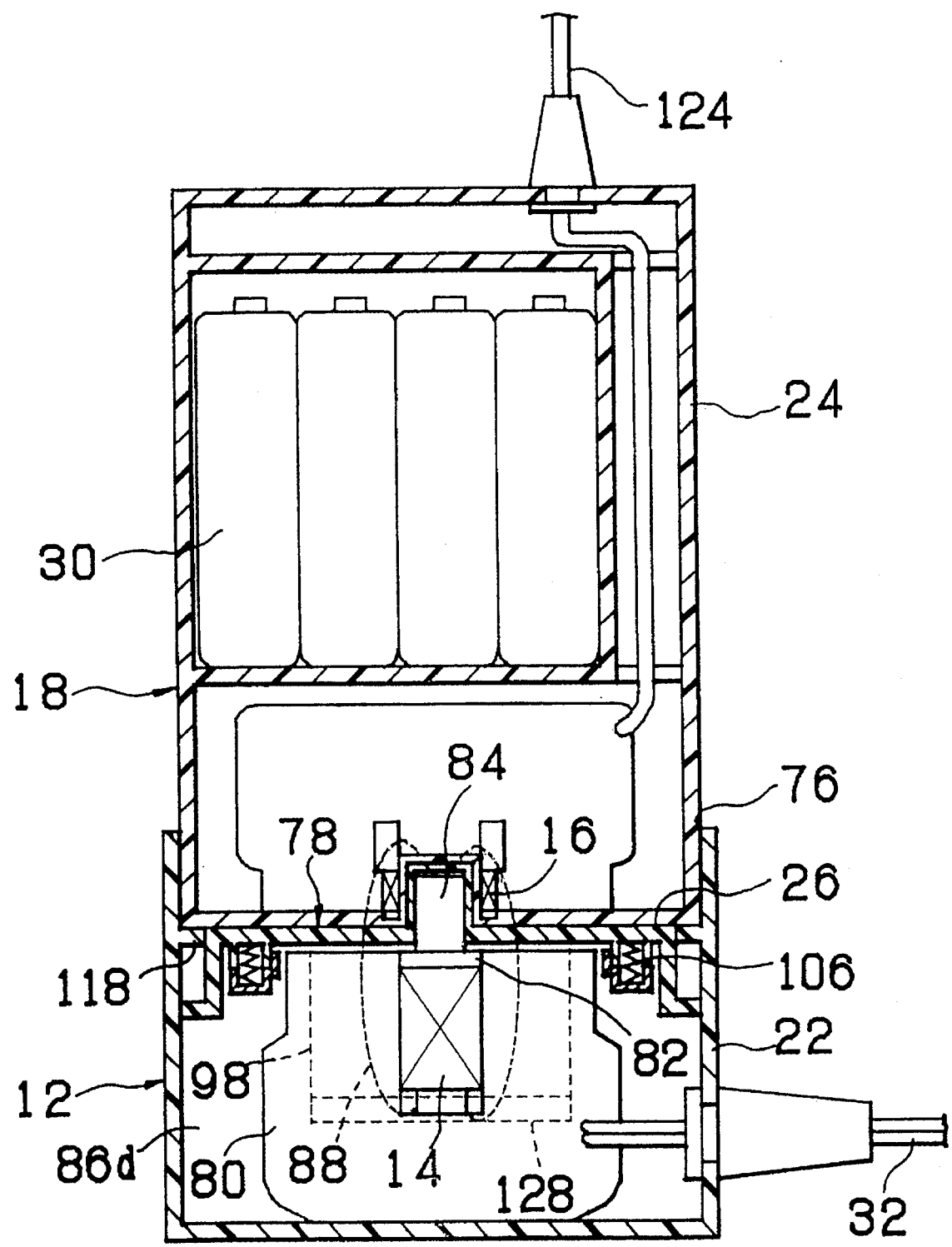
FIG. 5 is a cross-sectional view taken along a line V—V shown in FIG. 3.
Figure 6:
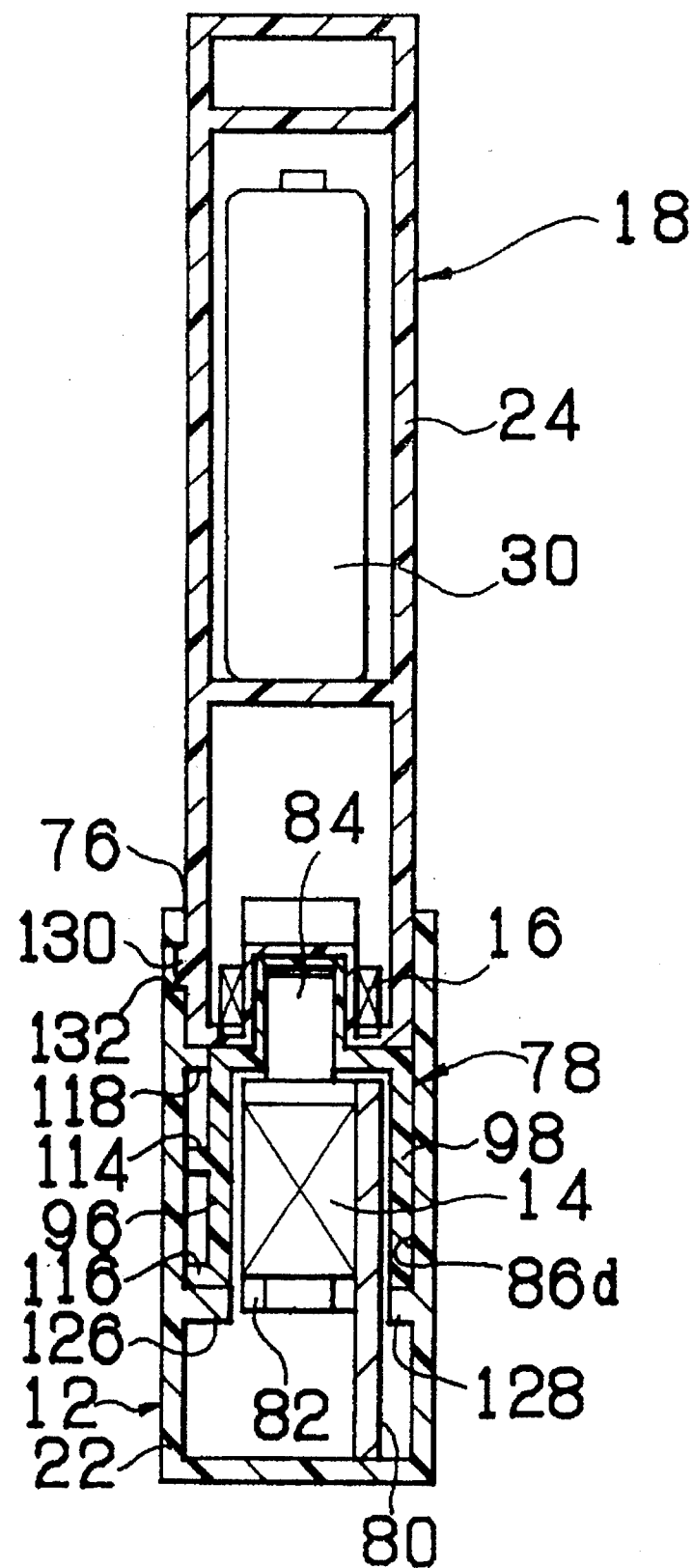
FIG. 6 is a cross-sectional view taken along a line VI—VI shown in FIG. 3.

As indicated in FIGS. 3, 5, 6, when the lower end of the device unit 18 is pressed into the opening 76 of the power source unit 12, the depressible member 78 is depressed against the urging of springs 106, whereby the exposed part of the magnetic core 84 from the bobbin 82 is completely covered by engaging projection 104 which is in turn inserted in engaging hole 102. In this depressed and engaged position, the secondary coil 16 is magnetically coupled to the primary coil 14.

The casing 24 of the device unit 18 has a projection 130, serving as a first engaging means, formed at a lower center portion, as best shown in FIG. 2. The height of the projection 130 is slightly smaller than the thickness of the casing 22. Also, the casing 22 of the power source unit 12 is formed with a recess or an opening 132, serving as a second engaging means, at an upper center portion, as best shown in FIG. 3. The opening 132 is slightly larger than the circumference of the projection 130.

Thus, when the device unit 18 is pushed and inserted into the opening 76 of the power source unit 12 in the above described manner to magnetically couple the coils 14 and 16, the projection 130 engages the opening 132 to maintain the device unit 18 in the inserted position.

In the above-described embodiment, the magnetic core 84 is provided at the side of the primary coil 14 and arranged to penetrate the secondary coil 16 when the power source unit 12 is coupled to the device unit 18. However, the present invention is not limited to the above embodiment, and a similar magnetic core may be arranged at the side of the secondary coil 16 as well. Moreover, the magnetic core itself may be omitted if the oscillating frequency of the inverter circuit 38 is raised. In this case, the coils may be formed by printing. In any case, the faces 26, 28 can be made flat.

Alternatively, the inverter circuit 38 is not limited to the self-excited model as above and may be suitably modified, for example, to be excited by a separate oscillator. Alternatively, the primary oscillator section 10 may be adapted to utilize the frequency of the commercial alternating current power source 34 directly, in place of using the inverter circuit 38.

The distance between the primary and secondary coils 14, 16 may be changed in different degree, so that the power supplied from the power source unit 12 to the device unit 18, namely, the charging current to the secondary battery 30 can be changed.

Furthermore, although the ribs, such as 119, are formed by separate members and are adhered on the inner face 86c of the first casing 22, such ribs may be integrally formed with the casing 22 by forming a suitable step at locations where the ribs are necessary. The same can be said to stop bars 126, 128.

Alternatively, step portions may be formed in the inner faces 86c, 86d to function both as the guide ribs 119 and as the stop bars 126, 128. The lower end of the guide plate 96 may be formed with uniform thick plate from guide rib 116 to guide rib 114 at the thickness equal to that of guide rib 116.

Also, the device unit 18 can be formed uniformly with the electric apparatus.

Although the present invention has been fully described in connection with one preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An induction charging apparatus having a power source unit and a device unit detachable from said power source unit, said induction charging apparatus comprising:

said power source unit comprising:
a first casing having one end opened;
a primary coil provided in said first casing;
oscillator means provided in said first casing for supplying an alternating current powered by a commercial alternating current power source to said primary coil to generate magnetic fluxes; and
a depressible member movably provided and closing said open end of said first casing, said depressible member movable between a lift position at which said magnetic fluxes are substantially located under said depressible member and inside said first casing, and a depressed position at which portions of said magnetic fluxes are substantially located over said depressible member and outside said first casing;

said device unit comprising:
a second casing having one end detachable to said open end of said first casing;
a secondary coil provided in said second casing and adjacent to said one end; and
load means provided in said second casing for receiving power from said secondary coil, whereby when said second casing is attached to said first casing with said depressible member being moved to said depressed position, said primary and secondary coils are coupled to link said magnetic fluxes from said primary coil to said secondary coil, and when said second casing is detached, said depressible member is moved to said lift position to prevent the leakage of said magnetic fluxes.

2. An induction charging apparatus according to claim 1, wherein said depressible member comprises a cover plate and at least one guide plate extending toward inside of said first casing along inner wall of said first casing from at least one side edge of said cover plate so as to guide said depressible member.

3. An induction charging apparatus according to claim 2, wherein said power source unit further comprises a guiding means for guiding said guide plate during the movement of said depressible member between said lift position and depressed position.

4. An induction charging apparatus according to claim 1, wherein said power source unit further comprises urging means for urging said depressible member towards said lift position.

5. An induction charging apparatus according to claim 4, wherein said power source unit further comprises first engaging means provided to said depressible member and upper engagable means provided to said first casing, said first engaging means and said upper engagable means being engaged to each other when said depressible member is moved by said urging means to said lift position for limiting a further upper movement of said depressible member.

6. An induction charging apparatus according to claim 4, wherein said power source unit further comprises second engaging means provided to said depressible member and lower engagable means provided to said first casing, said second engaging means and said lower engagable means being engaged to each other when said depressible member is moved against said urging means to said depressed position for limiting a further downward movement of said depressible member.

7. An induction charging apparatus according to claim 1, wherein said power source unit further comprises a third engaging means, and said device unit further comprises a fourth engaging means engagable to said third engaging means for holding said power source unit and said device unit in the attached position.

8. An induction charging apparatus according to claim 1, wherein said power source unit further comprises a magnetic core inserted to said primary coil.

9. An induction charging apparatus according to claim 8, wherein said depressible member is formed with a projected recess for receiving an end portion of said magnetic core when said depressible member is moved to said depressed position.

10. An induction charging apparatus according to claim 9, wherein said device unit is formed with a receiving recess for receiving said projected recess, said secondary coil being position around said receiving recess.

11. An induction charging apparatus according to claim 1, wherein said load means is a rechargeable battery.

* * * * *